United States Patent
Gamache et al.

(12) 
(10) Patent No.: US 6,243,825 B1
(45) Date of Patent: Jun. 5, 2001

(54) METHOD AND SYSTEM FOR TRANSPARENTLY FAILING OVER A COMPUTER NAME IN A SERVER CLUSTER

(75) Inventors: Rod Gamache, Issaquah; Mark Lucovsky, Redmond; John D. Vert, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/062,392

(22) Filed: Apr. 17, 1998

(51) Int. Cl.[7] ........................................ G06F 15/16
(52) U.S. Cl. ........................... 714/4; 709/249; 709/239; 709/228
(58) Field of Search .................................. 709/227, 228, 709/239, 235; 714/4

(56) References Cited

U.S. PATENT DOCUMENTS

| | | |
|---|---|---|
| 4,736,393 | 4/1988 | Grimes et al. . |
| 5,021,949 | 6/1991 | Morten et al. . |
| 5,027,269 * | 6/1991 | Grant et al. ............................ 709/300 |
| 5,117,352 * | 5/1992 | Falek ........................................ 714/4 |
| 5,128,885 | 7/1992 | Janis et al. . |
| 5,165,018 | 11/1992 | Simor . |
| 5,301,337 | 4/1994 | Wells et al. . |
| 5,341,372 | 8/1994 | Kirkham . |
| 5,398,329 | 3/1995 | Hirata et al. . |
| 5,416,777 | 5/1995 | Kirkham . |
| 5,423,037 | 6/1995 | Hvasshovd . |
| 5,434,865 | 7/1995 | Kirkham . |
| 5,435,003 * | 7/1995 | Chng ....................................... 709/239 |
| 5,490,270 | 2/1996 | Devarakonda et al. . |
| 5,491,800 | 2/1996 | Goldsmith et al. . |
| 5,537,532 | 7/1996 | Chng et al. . |
| 5,568,491 | 10/1996 | Beal et al. . |
| 5,666,486 * | 9/1997 | Alfieri et al. ........................... 709/217 |
| 5,666,538 | 9/1997 | DeNicola . |
| 5,710,727 | 1/1998 | Mitchell et al. . |
| 5,715,389 | 2/1998 | Komori et al. . |
| 5,737,601 | 4/1998 | Jain et al. . |
| 5,745,669 | 4/1998 | Hugard et al. . |
| 5,754,752 * | 5/1998 | Sheh et al. ............................... 714/4 |

(List continued on next page.)

OTHER PUBLICATIONS

Carr, Richard, "The Tandem Global Update Protocol," *Tandem Systems Review*, vol. 1, No. 2, 74–85 (1985).

Lamport, Leslie, A Fast Mutual Exclusion Algorithm, Digital Equipment Corporation, Oct. 31, 1986.

Lamport, Leslie, The Part–Time parliament, Digital Equipment Corporation, Sep. 1, 1989.

Chen et al., "Designing Mobile Computing Systems Using Distributed Objects," IEEE Communications Magazine, vol. 35, No. 2, pp. 62–70 (Feb. 1997), http: iel.his.com: 80 cgi–bin?iel$_{13}$ egi?se . . . 2ehts printed May 21, 1999.

(List continued on next page.)

*Primary Examiner*—Krisna Lim
(74) *Attorney, Agent, or Firm*—Michalik & Wylie, PLLC (57) ABSTRACT

A method and system for transparently failing over a computer name with a legacy application running in a server cluster. When the application is set for failing over in the cluster, the cluster software locates a virtual computer name on which the application is dependent, and associates the virtual name with the application. When the application runs and requests its computer name from the system, the system looks for the virtual computer name, and, if detected, the system returns the virtual computer name to the application as the computer name. The virtual computer name thus moves with the application regardless of the machine on which it is running in the cluster. When the application is not set for failing over in the cluster, the system instead returns the actual machine name.

42 Claims, 8 Drawing Sheets

U.S. PATENT DOCUMENTS

| | | |
|---|---|---|
| 5,754,877 | 5/1998 | Hagersten et al. . |
| 5,757,642 | 5/1998 | Jones . |
| 5,768,523 | 6/1998 | Schmidt . |
| 5,768,524 | 6/1998 | Schmidt . |
| 5,781,737 | 7/1998 | Schmidt . |
| 5,787,247 | 7/1998 | Norin et al. . |
| 5,794,253 | 8/1998 | Norin et al. . |
| 5,805,839 | 9/1998 | Singhal . |
| 5,806,075 | 9/1998 | Jain et al. . |
| 5,812,779 | 9/1998 | Ciscon et al. . |
| 5,815,649 | 9/1998 | Utter et al. . |
| 5,819,019 * | 10/1998 | Nelson .................................... 714/4 |
| 5,822,532 | 10/1998 | Ikeda . |
| 5,832,514 | 11/1998 | Norin et al. . |
| 5,857,073 | 1/1999 | Tsukamoto et al. . |
| 5,919,247 | 7/1999 | Van Hoff et al. . |
| 5,933,422 * | 8/1999 | Kusano et al. ....................... 370/331 |
| 5,935,230 | 8/1999 | Pinai et al. . |
| 5,940,870 | 8/1999 | Chi et al. . |
| 5,946,689 | 8/1999 | Yanaka et al. . |
| 5,963,960 | 10/1999 | Swart et al. . |
| 5,968,121 | 10/1999 | Logan et al. . |
| 5,968,140 | 10/1999 | Hall . |
| 5,982,747 | 11/1999 | Ramfelt et al. . |
| 5,991,771 | 11/1999 | Falls et al. . |
| 5,991,893 | 11/1999 | Snider . |
| 6,003,075 | 12/1999 | Arendt et al. . |
| 6,044,367 | 3/2000 | Wolff . |
| 6,047,323 | 4/2000 | Krause . |
| 6,134,673 * | 10/2000 | Chrabaszcz . |

OTHER PUBLICATIONS

Chowdhury, et al., "Supporting Dynamic Space–Sharing on Clusters of Non–dedicated Workstations," International Conference on Distributed Computing Systems, pp. 149–158 (1997).

Islam et al., "Extensible Resource Management for Cluster Computing," Distributed computing Systems, 1997, Proceedings of the 17th International Conference, pp. 561–568 (May 1997).

* cited by examiner

METHOD AND SYSTEM FOR TRANSPARENTLY FAILING OVER A COMPUTER NAME IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

Thus, the failover of an application from one server (i.e., machine) to another in the cluster may be automatic in response to a software or hardware failure on the first machine, or alternatively may be manually initiated by an administrator. However, unless an application is "cluster-aware" (i.e., designed with the knowledge that it may be run in a clustering environment), problems arise during failover.

One problem with existing applications which are not cluster-aware, i.e., legacy applications, is that such applications assume that the current machine name is the only computer name. Consequently, if the application exposes the machine name to clients, or writes the machine name into its persistent configuration information, the system will not function correctly when the application fails over and runs on a different machine having a different machine name. By way of example, an electronic mail application program provides its machine name to other machines connected thereto in a network. If the application is running in a cluster and is failed over to another machine, this other machine's name will not be the name that was provided to the other network machines, and the application will not function correctly.

A cluster-aware application avoids this problem when it is running in a cluster by allowing multiple machine names and calling a cluster-specific application programming interface (API) that returns a virtual computer name regardless of the actual cluster machine on which the application is being run. However, it is not practical to change the many legacy applications so as to be cluster-aware applications. At the same time, other applications on the same machine may need to receive different computer names (e.g., a different virtual computer name or its actual machine name) rather than any particular virtual machine name in response to a request for its computer name. As a result, it is not feasible to develop an interface that simply returns a single virtual computer name each time such a request is made by an application.

SUMMARY OF THE INVENTION

The present invention provides a method and system for providing a legacy application with a single virtual machine identity that is independent of the physical machine identity, whereby the application can run on any physical machine in a cluster. The method and system selectively return an appropriate computer name based on whether the application is set for failing over in a cluster.

Briefly, the present invention transparently fails over a computer name with a legacy application running in a server cluster by returning a virtual computer name to the application. The virtual computer name moves with the application regardless of the machine on which it is running. When a cluster receives a request to run an application, a process environment block associated with the application is set up, as described below. If the application is set for failing over in the cluster, the cluster software locates a virtual computer name on which the application is dependent, regardless of the machine on which the application is running, by searching a dependency tree of cluster resources associated with the application. The cluster software then writes the virtual computer name into the process environment block, and the application is run. When the system receives a request from the application to return a computer name thereto, the system looks for the virtual computer name in the process environment block, and, if detected, returns the virtual computer name to the application as the computer name. When the application is not set for failing over in the cluster, the virtual name is not written into the process environment block and the system instead returns the actual machine name.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
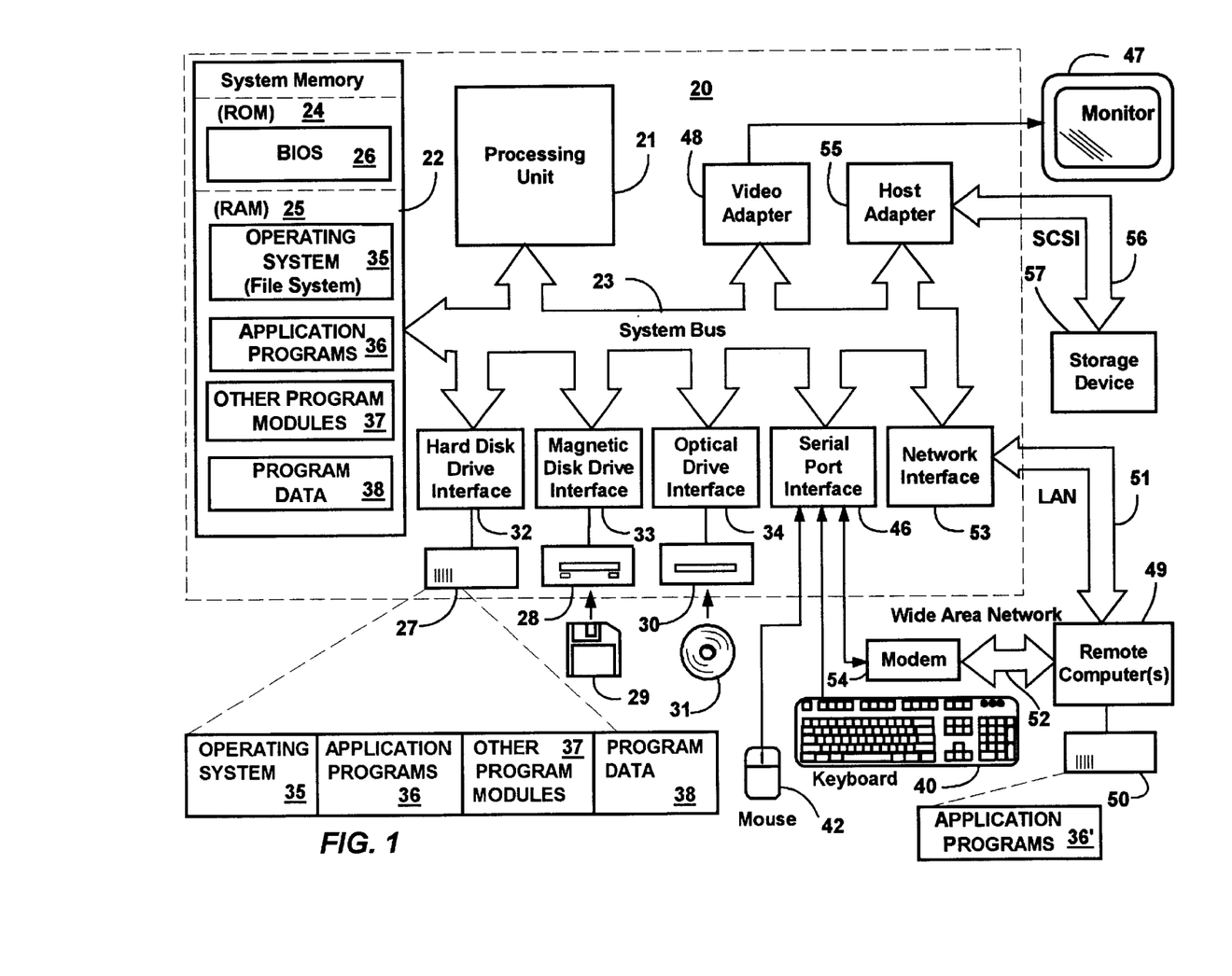
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
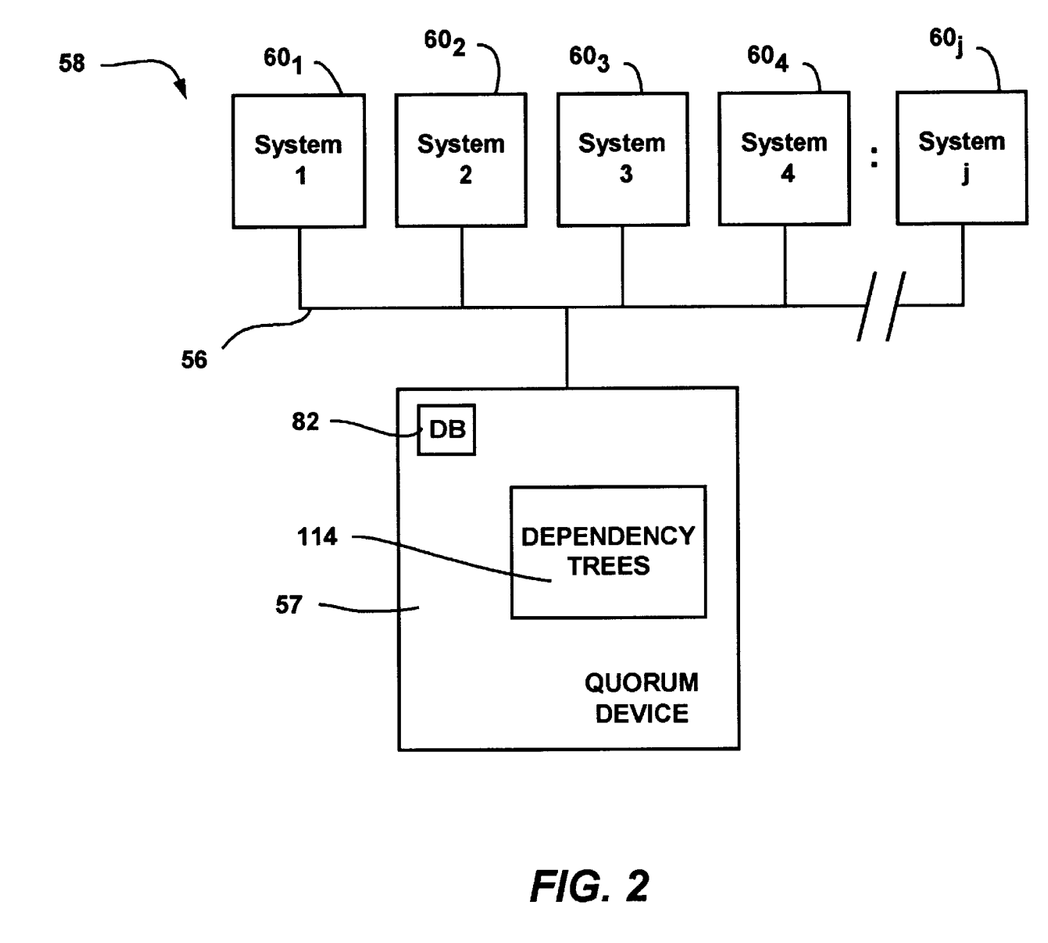
FIG. 2 is a block diagram representing a server cluster including various cluster machines and a shared quorum device.

The preferred system 20 further includes a host adapter 55 or the like which connects the system bus 23 to a SCSI (Small Computer Standard Interface) bus 56 for communicating with at least one persistent memory storage device 57, also referred to herein as a quorum device. Of course, other ways of connecting cluster systems to a storage device, including Fibre Channel, are equivalent. In any event, as shown in FIG. 2, the computer system 20 may comprise the system 601, while one of the remote computers 49 may be similarly connected to the SCSI bus 56 and comprise the system 602, and so on. Note that multiple shared storage devices may be connected to the SCSI bus 56 (or the like) such as for purposes of resilience to disk failure through the use of multiple disks, i.e., software and/or hardware-based redundant arrays of inexpensive or independent disks (RAID).

To create a new cluster, a system administrator runs a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

Figure 3:
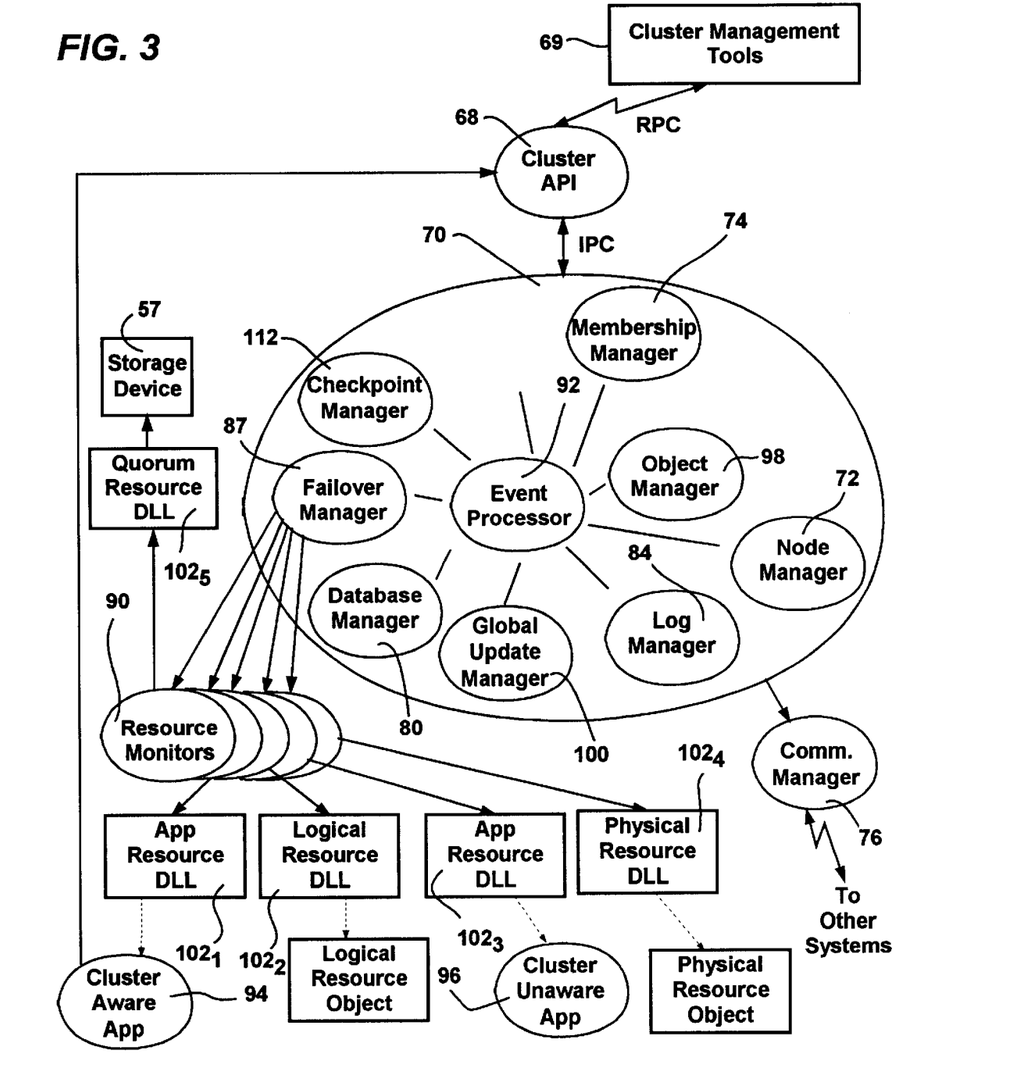
FIG. 3 is a representation of various components within the clustering service of a machine.

As shown in FIG. 3, to accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself.

Cluster Service Components

FIG. 3 provides a representation of the cluster service components and their general relationships in a single system (e.g., 601) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is essentially in constant communication with the other systems of the cluster. In a small cluster, communication is fully connected, i.e., all systems of the cluster 58 are in direct communication with all other systems.

Systems (e.g., $60_1$–$60_j$ of FIG. 2) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database manager 80 which implements the functions that maintain a cluster configuration database on a local device such as a disk and/or memory, and a configuration database 82 (FIG. 2) on the common persistent storage devices, (e.g., storage device 57). The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. As described below, global updates are used to ensure the consistency of the cluster database in each of the systems. The configuration database manager 80 also provides an interface to the configuration database 82 for use by the other cluster service 70 components.

A logging manager 84 provides a facility that works with the database manager 80 to maintain cluster state information across a situation in which a cluster shuts down and a new cluster is later formed with no members common to the previous cluster, known as a temporal partition. The logging manager 84 operates with a log file, preferably maintained on the quorum device (storage device 57), to unroll logged state changes when forming a new cluster following a temporal partition.

Figure 4:
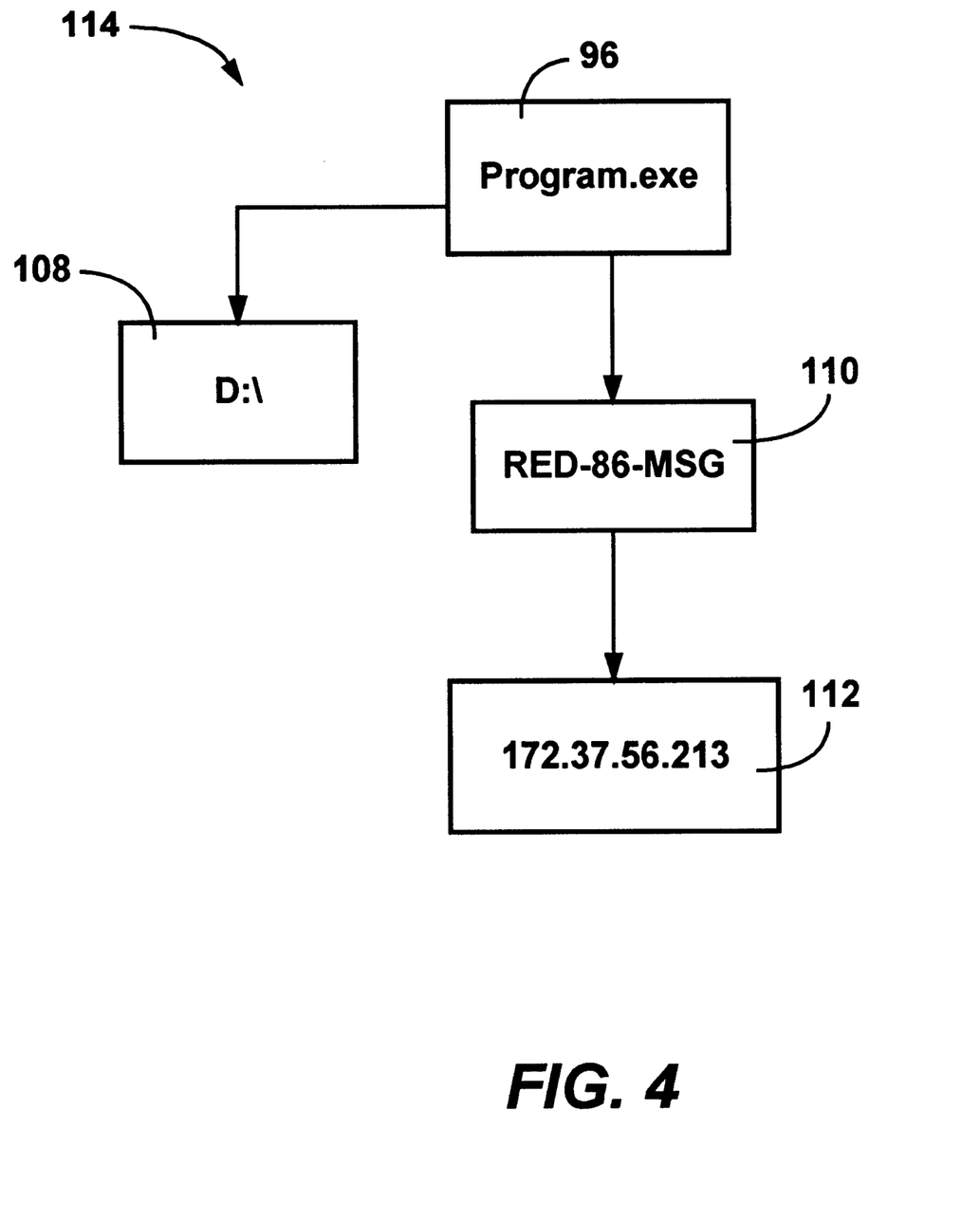
FIG. 4 is a representation of a dependency tree maintained in a cluster for an application.

A failover manager 87 makes resource/group management decisions and initiates appropriate actions, such as startup, restart and failover. The failover manager 87 is responsible or stopping and starting the system's resources, managing resource dependencies, and for initiating failover of groups. group is a unit of failover. A collection of related resources are organized into a group to allow an administrator to manage them as a single unit. Usually a group contains all of the elements needed to run a specific application, and for client systems to connect to the service provided by the application. For example, as represented in FIG. 4, a group may be set up for a process such as an application 96 (Program.exe) and include as its dependent resources a disk drive 108 (D:\) for storing files, a computer (network) name 110 (RED-86-MSG) and an Internet Protocol (IP) address 112 (172.37.56.213). In a preferred arrangement, the dependencies of all resources in the group are maintained in a directed acyclic graph, known as a dependency tree 114, as represented in FIG. 4. Such dependency trees may be maintained on the shared disk 57 and/or replicated to all machines in the cluster. Group operations performed on a group affect all resources contained within that group. Dependency trees are also described in U.S. patent application Ser. No. 08/963,049, entitled "Method and System for Resource Monitoring of Disparate Resources in a Server Cluster," assigned to the same assignee as the present invention.

The failover manager 87 component receives resource and system state information from at least one resource monitor 90 and the node manager 72, for example, to make decisions about groups. The failover manager 87 is responsible for deciding which systems in the cluster should "own" which groups. Those systems that own individual groups turn control of the resources within the group over to their respective failover managers 87.

An event processor 92 connects the components of the cluster service 70 by providing a mechanism for event notifications. The event processor 92 propagates events to applications (e.g., 94 and 96) and to and from the components within the cluster service 70. An object manager 98 maintains various cluster objects, and a global update manager 100 operates to provide a global update service that is used by other components within the Cluster Service 70.

The global update protocol (GLUP) is used by the global update manager 100 to broadcast updates to each node in a cluster. GLUP generally comprises a standard global update message format, state information maintained in each node, and a set of rules that specify how global update should be processed and what steps should be taken when failures occur. In general, according to the GLUP protocol, one node (e.g. $60_1$) serves as a "locker" node. The locker node $60_1$ ensures that only one global update is in progress at any given time. With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the system. In accordance with GLUP, the sender node sends the updates, one at a time, to the other nodes in a predetermined GLUP order that is ordinarily based on a unique number assigned to each node. GLUP can be utilized to replicate data to the machines of a cluster. A more detailed discussion of the GLUP protocol is described in the publication "Tandem Systems Review" Volume 1, Number 2, June, 1985 pp. 74–84.

A resource monitor 90 runs in one or more processes that may be part of the cluster service 70, but are shown herein as being separate from the cluster service 70 and communicating therewith via Remote Procedure Calls (RPC) or the like. The resource monitor 90 monitors the health of one or more resources (e.g., $102_1$–$102_5$) via callbacks thereto. The monitoring and general operation of resources is described in more detail in the aforementioned U.S. patent application Ser. No. 08/963,049, hereby incorporated by reference herein in its entirety.

The resources (e.g., $102_1$–$102_5$) are implemented as one or more Dynamically Linked Libraries (DLLs) loaded into the address space of the Resource Monitor 102. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $102_1$–$102_5$ run in the system account and are considered privileged code. Resources $102_1$–$102_5$ may be defined to run in separate processes, created by the Cluster Service 70 when creating resources.

Resources expose interfaces and properties to the cluster service 70, and may depend on other resources, with no circular dependencies allowed. If a resource does depend on other resources, the resource is brought online after the resources on which it depends are already online, and is taken offline before those resources. Moreover, each resource has an associated list of systems in the cluster on which this resource may execute. For example, a disk resource may only be hosted on systems that are physically connected to the disk. Also associated with each resource is a local restart policy, defining the desired action in the event that the resource cannot continue on the current system.

Systems in the cluster need to maintain a consistent view of time. One of the components, known as the time source and selected by the administrator or a default group failover policy, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The node manager 72 begins the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the newcomer is sent an updated copy of the shared database. The joining system uses this shared database to find shared resources and to bring them online as needed, and also to find other cluster members.

If a cluster is not found during the discovery process, a system will attempt to form its own cluster. In general, to form a cluster, the system gains exclusive access to a special resource known as the quorum resource (quorum device or disk) 57. The quorum resource 57 is used as a tie-breaker when booting a cluster and also to protect against more than one node forming its own cluster if communication fails in a multiple node cluster. The quorum resource is often (but not necessarily) a disk that maintains the state of the cluster, which a node arbitrates for and needs possession of before it can form a cluster. The quorum resource 57 preferably maintains a log file that is unrolled to ensure consistency across a temporal partition when forming a new cluster, after another cluster previously existed. The node 57 that has possession of the quorum resource is responsible for logging operations, and thus if application configuration information is replicated, such an operation is logged. Also, the quorum resource 57 offers a method for arbitrating a quorum resource object, typically by challenging (or defending) for an exclusive reservation of a storage device (e.g., 57 of FIG. 2) such as a disk that ordinarily stores log data for the cluster. A method for releasing an exclusive reservation may also be provided. The general operation of quorum resources including arbitration and exclusive possession of the quorum resource is described in more detail in U.S. patent application Ser. No. 08/963,050 entitled "Method and System for Quorum Resource Arbitration in a Server Cluster," assigned to the same assignee and hereby incorporated by reference herein in its entirety.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster. Groups can be failed over or moved from one system to another as atomic units. Each group has a cluster-wide policy associated therewith comprising an ordered list of owners. A group fails over to systems in the listed order.

For example, if a resource (e.g., an application) fails, the failover manager 87 may choose to restart the resource, or to take the resource offline along with any resources dependent thereon. If the failover manager 87 takes the resource offline, the group is restarted on another system in the cluster, known as pushing the group to another system. A cluster administrator may also manually initiate such a group transfer. Both situations are similar, except that resources are gracefully shutdown for a manually initiated failover, while they are forcefully shut down in the failure case.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 87 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when the failback occurs.

Computer Name Failover

As described above, the cluster service treats computer names and applications as a resource, and each group of resources operates as a virtual server that contains one or more dependency trees of related resources. The dependency tree supplies the information that allows the cluster to start and stop resources in the correct order, and also specifies the dependencies among resources in a group. Thus, as shown in FIG. 4, an application resource 96 that relies on a specific disk resource 108 and computer (network) name resource 110 depends on that disk and computer name.

In accordance with one aspect of the present invention, a legacy application 96 run in a cluster 58 is provided with the (virtual server's) computer name rather than the actual machine name. In effect, this leads the application into believing that it is running on a machine named the virtual computer name rather than the actual name. Since the virtual computer name is independent of the actual machine on which the application is running, the name provided to other machines or stored in the local configuration information by the application remains consistent regardless of the machine on which the application is actually running. However, when the machine is not running in a cluster but in some other environment, (or when an application is set to return its actual name for another reason, regardless of whether in a clustering environment), the actual machine name is instead returned, whereby the application functions properly.

To accomplish the selective returning of a virtual server name to a legacy application in a clustering environment, a name is selected and given to the application that is independent of the machine on which the application is running and which remain consistent throughout the cluster 58. As described above, resources including applications have group information of dependent resources maintained therefor in a dependency tree. A legacy application 96 in a cluster 58 depends on a virtual server computer name 110 so that the name is available to clients whenever the application 96 is running. To determine the name to use, whenever the application 96 is about to be run in the cluster 58, the correct computer name for an application is determined by searching the application's dependency tree 114 for a computer name resource 110. By searching the dependency tree 114 in a consistent manner, (e.g., locating the first virtual computer name found via a depth-first or breadth-first search with a strict ordering between multiple dependencies at the same level), the same virtual computer name 110 will be located on any machine in the cluster even if multiple such names are in a dependency tree, (although the need to use multiple network names for a single legacy application is unlikely). Thus, in the example shown in FIG. 4, when the application 96 named Program.exe is run, the dependency tree 114 is searched, resulting in the name "RED-86-MSG" being located as its virtual (server) computer name 110.

Figure 5:
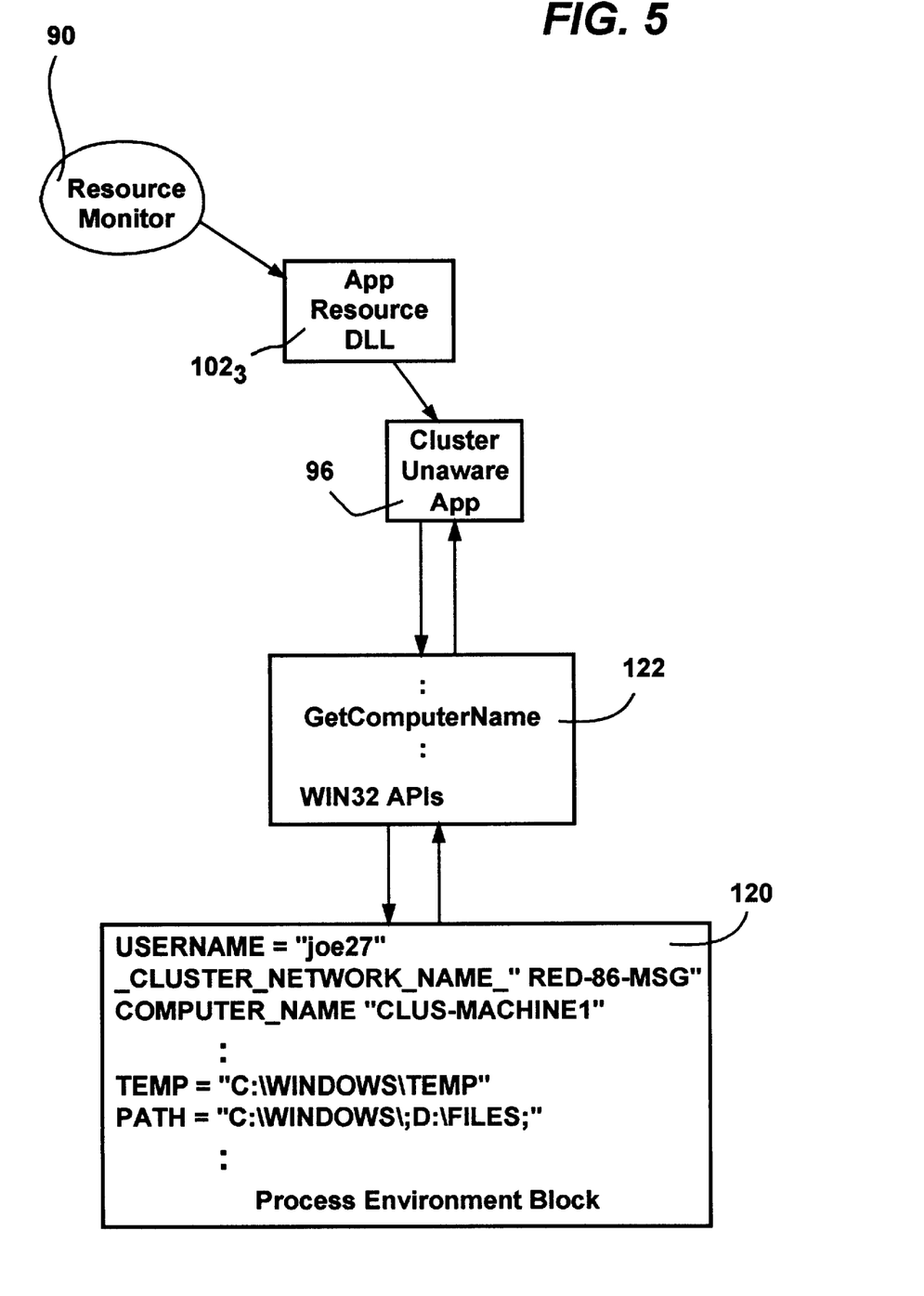
FIG. 5 is a block diagram generally representing the components for returning a virtual computer name in accordance with one aspect of the present invention.

Once located, to pass the virtual computer name to the application's process, (and any child processes thereof), a mechanism known as a process environment block is used. In general, for each legacy application to be run in a cluster, the cluster service creates an environment therefor and stores information in a process environment block associated with the application. Thus, as shown in FIG. 5, the legacy application 96 has an associated process environment block 120 which maintains strings and/or other data therein for running the application 96. The information typically includes environment information such as a username, path, temporary directory and so on.

In accordance with one aspect of the present invention, the resource DLL (e.g., 1023) for the application 96 running in a corresponding resource monitor process 90 (FIG. 3) adds a distinguished environment variable named the \_CLUSTER\_NETWORK\_NAME\_ to the process environment block 120. The \_CLUSTER\_NETWORK\_ NAME\_ is set with the virtual computer name (RED-86-MSG) that was located in the search of the dependency tree 114 and which will be used to represent the name of the machine wherever the application is run in the cluster.

To selectively return the appropriate name (the virtual name when run in a cluster, otherwise the actual name), the system code 122 used by the legacy application 96 is employed. In a preferred embodiment, legacy applications receive a computer name from the system code 122 through the WIN32 application programming interface (API) named GetComputerName( ), as shown in FIG. 5. Thus, in accordance with one aspect of the present invention, when a name request is received from an application, the GetComputerName( ) API checks for the existence of the distinguished environment variable (\_CLUSTER\_ NETWORK\_NAME\_) in the process environment block 120 instead of simply returning the local machine name. If the variable exists, its contents, which include the virtual computer name, are returned to the application. If it does not exist, the actual computer name is returned. As a result, when set for failing over in a clustering environment, whenever the legacy application 96 uses what it thinks is the local computer name, the virtual server name is used instead. Note that as used herein, "failing over," "failing," "failover" and the like refer to the termination and restarting of a resource on a surviving server, whether automatic in response to a software or hardware failure on a cluster machine, or manually, as initiated by an administrator. As can be appreciated, this transformation is transparent to the application, whereby existing applications that are not cluster-aware may used in a virtual server. This allows high-availability failover capabilities to be added to existing applications. Note that since any attempt to retrieve the computer name from a process results in the name of the virtual server rather than the actual computer name, and any child process of the application will normally inherit the environment, the virtual server name is automatically propagated to all child processes.

Figure 6:
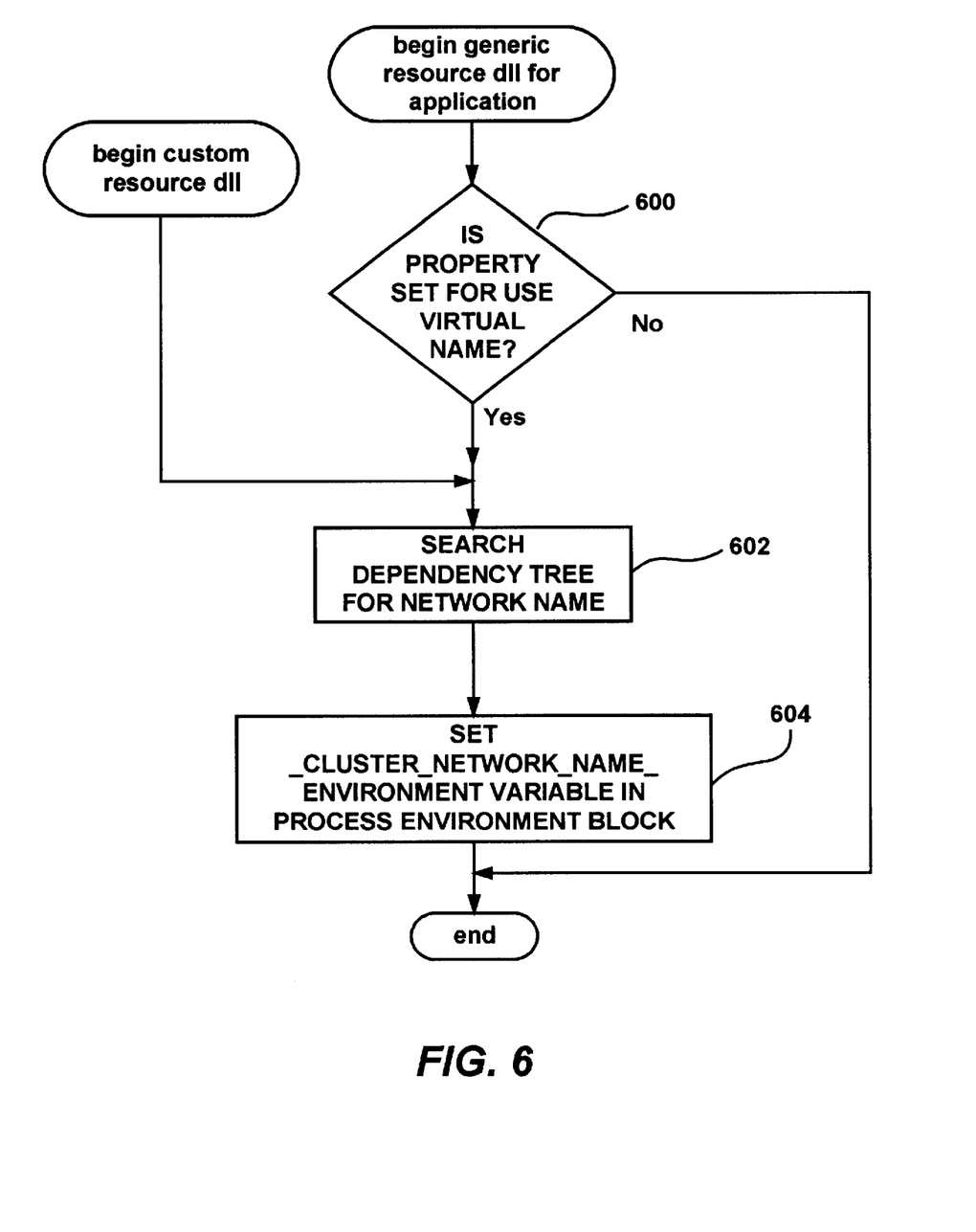
FIG. 6 is a flow diagram generally representing the steps taken to determine a virtual computer name in accordance with an aspect of the present invention.
Figure 7:
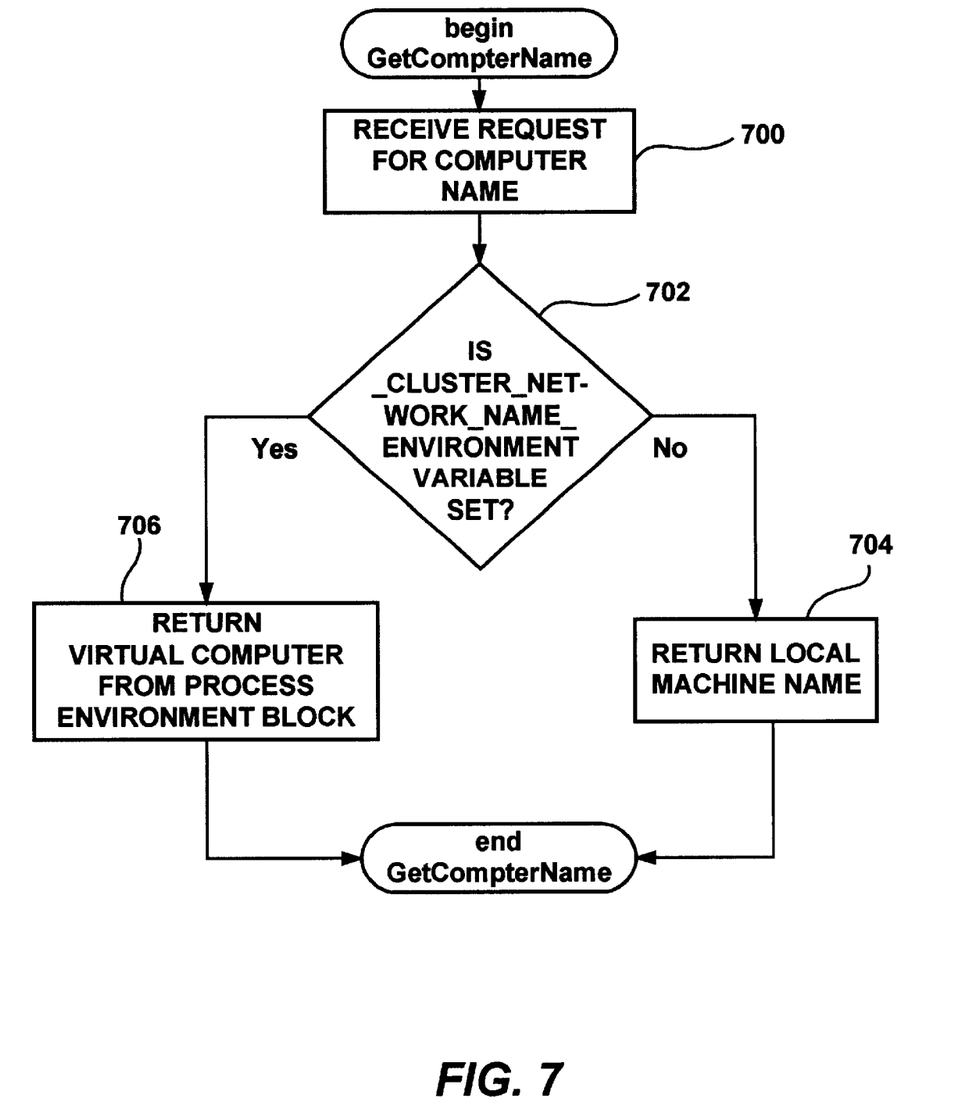
FIG. 7 comprises a flow diagram generally representing the steps taken to return an appropriate computer name in accordance with an aspect of the present invention.

Turning to an explanation of the operation of the invention with particular respect to the flow diagrams of FIGS. 6 and 7, as shown in FIG. 6, when a legacy application 96 is to be run in a cluster, the resource DLL (e.g., 102₃) first determines an appropriate computer name to return to the application. For a generic application, a property may be set for the application, such as by an administrator via a user interface checkbox or the like, that informs the resource DLL (e.g., 102₃) whether a virtual server name should be used. If this property is set as determined by step 600, then at step 602, the virtual name (e.g., RED-86-MSG) is located by searching the application's dependency tree 114 (FIG. 4) for a computer name resource 110 as described above. Then, at step 604, and as shown in FIG. 5, the name is written into the process environment block 120.

Note that if a custom resource dll is specifically tailored for an application, the dll may know that the computer name to be given to the application is always intended to be the virtual name. In such an event, the custom resource dll automatically sets up the virtual computer name directly, without needing an optional property and user interface. For example, the custom resource dll may directly perform steps similar to steps 602–604 to appropriately set the environment variable in the process environment block 120. In contrast, the generic application (e.g., 102₃) and corresponding service resource DLL uses an optional property and provides a user interface.

At this time, the process environment block 120 is set up and the application 96 is started. When the application 96 makes a request for the computer name, the request is received by the system code 122 (via the GetComputerName( ) API) at step 700 of FIG. 7. In accordance with one aspect of the present invention, rather than simply returning the actual machine name, step 702 is performed to determine whether the _CLUSTER_NETWORK_NAME environment variable is present in the process control block 120. If the variable is not present, then at step 704 the system code 122 simply returns the machine name of the machine, which would be CLUS-MACHINE-1 in the present example. Conversely, if the _CLUSTER_NETWORK_NAME environment variable is set, (as shown in FIG. 5), step 706 returns the virtual computer name that is set in the process environment block 120, i.e., the string "RED-86-MSG" in the present example. Since the virtual server name (which moves with the application) is returned when the application is set to fail over in a cluster, whenever the application exposes its name to clients and/or writes the machine name into its persistent configuration information, the machine name will be consistent if the application fails over to another machine in the cluster. Conversely, when the machine is not operating in a cluster, the _CLUSTER_NETWORK_NAME environment variable is not set, whereby the application otherwise operates as before. Moreover, since any child process of the application will normally inherit the environment, the virtual server name is automatically propagated to all child processes.

As can be appreciated, the above-described system and method may be extended for other purposes. Indeed, the present invention can operate with any dependent identity returned to an application. For example, the IP address that an application receives when run in a cluster (and thus moves with it if failed over) may be the IP address 112 in the application's dependency tree rather than a permanent IP address of a local node. Since the process environment block is a general mechanism, it can be readily appreciated that the use of this virtual server name may be applied in non-clustering uses, provided there is some mechanism to determine when to set the environment variable so as to return the virtual server name instead of the computer name.

Figure 8:
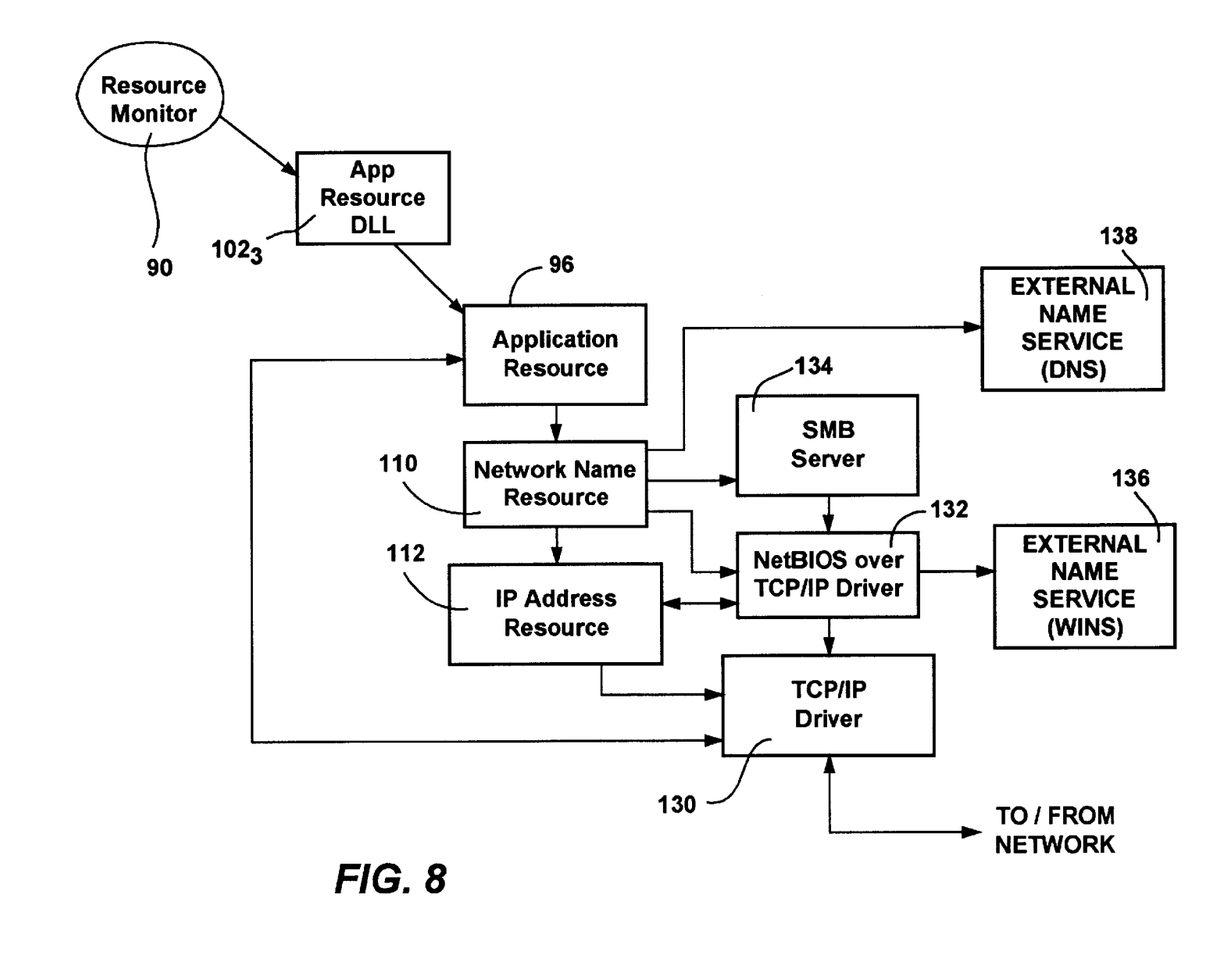
FIG. 8 is a block diagram generally representing the components for using cluster resources in a network in a manner that facilitates failover.

To failover the application in a manner that is transparent to the network, name and IP address pairs are moved as a unit to another machine. To this end, a computer name resource registers an appropriate variant of a computer identity with one or more Internet Name Services (e.g., DNS or WINS). For example, with NetBIOS, as shown in FIG. 8, the resource monitor 90, which brings resources online (and offline) in a correct dependency order, first instructs the IP Address resource 112 to come online. Note that the application 96 is dependent on the network name resource 110, which in turn is dependent on the IP address resource 112, and thus the IP address resource 112 is brought online first. The IP address resource 112 then communicates with a NetBIOS over TCP/IP driver 132 to create a NetBIOS device and bind it to the IP address, (e.g., 172.37.56.213). The computer name resource 110 communicates with an SMB Server 134, instructing it to bind to the NetBIOS device and register a variant of the computer name. This causes the NetBIOS over TCP/IP driver 132 to register that name variant with an external name service (WINS) 136. The computer name resource 110 then opens the NetBIOS device and registers another variant of the name, causing the NetBIOS driver 132 to register that name variant with the external name service 136. Note that in addition, as also shown in FIG. 8, the Network Name Resource 110 may directly register the computer identity with another name service (DNS) 138. Lastly the application 96 is brought online. The application 96 opens up the TCP/IP driver 130, and begins listening on the network for its IP address.

When the application is failed over, this process is effectively undone by de-registering the name or names, which (sometimes) also causes the name to be released from the external name service 134. After control of the resources are transferred to another machine in the cluster, the other machine repeats the above-described process to again bring the machine online in the network. In keeping with the invention, since the group of resources is failed over as a single unit, the virtual computer name and IP address is the same regardless of which machine the application is actually running on. Note that because the name-to-IP address binding is always the same, it does not matter whether the mapping is de-registered from the network name services, since the same name to address mapping will again be registered.

As can be seen from the foregoing detailed description, there is provided a method and system for transparently failing over an application and an associated virtual computer name from one machine to another in a server cluster. The method and system selectively return an appropriate computer name based on whether the application is set for failing over in a cluster.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of returning a computer identity to an application independent of the machine on which the application is running, comprising:

providing a machine for running the application, the machine having a first computer identity;

associating a second computer identity with the application;

receiving a request from the application to return a computer identity to the application;

determining that the application is set for failing over in a cluster environment; and returning the second computer identity to the application in response to the request.

2. The method of claim 1 wherein associating the second computer identity with the application includes searching a dependency tree for a virtual computer name.

3. The method of claim 1 wherein associating the second computer identity with the application includes writing a virtual computer name into a block of information associated with the application.

4. The method of claim 3 wherein determining if the application is set for failing over includes checking for the virtual computer name in the block of information.

5. The method of claim 1 wherein associating the second computer identity with the application includes searching a dependency tree for a virtual Internet protocol address.

6. The method of claim 1 further comprising creating a child process of the application, receiving a request to return a computer identity to the child process, and returning the second computer identity to the child process in response to the request.

7. The method of claim 1 wherein associating the second computer identity with the application includes providing a selection mechanism for defining a virtual server for the application.

8. A computer-readable medium having computer executable instructions for performing the method of claim 1.

9. A method of selectively returning a computer identity to an application, comprising:

(a) providing a machine for running the application, the machine having a first computer identity;

(b) determining if the application is to be failed over in a server cluster, and if the application is to be failed over, associating with the application a second computer identity that is independent of the machine;

(c) running the application;

(d) receiving a request from the application to return a computer identity to the application, and in response, determining if the second computer identity is associated with the running application; and (i) if the second computer identity is associated with the running application, returning the second computer identity to the application in response to the request, and (ii) if the second computer identity is not associated with the running application, returning the first computer identity to the application.

10. The method of claim 9 wherein determining if the application is to be failed over in a server cluster comprises running a custom dynamic link library.

11. The method of claim 9 wherein associating the second computer identity with the application includes searching a dependency tree for a virtual computer name.

12. The method of claim 9 wherein associating the second computer identity with the application includes writing a virtual computer name into a block of information associated with the application.

13. The method of claim 12 wherein determining if the second computer identity is associated with the running application includes checking for the virtual computer name in the block of information.

14. The method of claim 9 wherein associating the second computer identity with the application includes searching a dependency tree for a virtual Internet protocol address.

15. The method of claim 9 further comprising creating a child process of the application, receiving a request to return a computer identity to the child process, and if the second computer identity is associated with the running application, returning the second computer identity to the child process in response to the request.

16. The method of claim 9 wherein associating with the application the second computer identity includes providing a selection mechanism for defining a virtual server for the application.

17. The method of claim 9 wherein determining if the application is to be failed over in a server cluster comprises checking a property of the application.

18. A computer-readable medium having computer executable instructions for performing the method of claim 9.

19. In a server cluster, a method of returning a computer name to an application, comprising:

receiving a request to run the application on a machine in the cluster;

establishing a process environment block associated with the application;

searching a dependency tree for a virtual computer name related to the application;

writing the virtual computer name into the process environment block;

running the application;

receiving a request from the application to return a computer name thereto;

detecting the virtual computer name in the process environment block; and returning the virtual computer name to the application as the computer name.

20. The method of claim 19 further comprising failing the application on the machine, and running the application on another machine in the cluster.

21. The method of claim 20 further comprising, establishing a new process environment block on the other machine in the cluster and associating the new process environment block with the application, searching the dependency tree for the virtual computer name related to the application, writing the virtual computer name into the new process environment block, receiving a request from the application to return a computer name thereto, detecting the virtual computer name in the new process environment block, and returning the virtual computer name to the application as the computer name.

22. The method of claim 19 further comprising creating a child process of the application, the child process inheriting the process environment block of the application, receiving a request to return a computer name to the child process, and returning the virtual computer name in the process environment block to the child process in response to the request.

23. The method of claim 19 further comprising receiving a virtual computer name, and storing the virtual computer name in the dependency tree.

24. The method of claim 19 further comprising determining if the application is to be failed over in a server cluster.

25. The method of claim 24 wherein determining if the application is to be failed over comprises checking a property of the application.

26. A computer-readable medium having computer executable instructions for performing the method of claim 19.

27. In a server cluster, a system for returning a computer name to an application, comprising:
- a dependency tree maintained in the cluster for the application, the dependency tree including a virtual computer name in a dependent relationship with the application;
- a block of information associated with the application;
- a mechanism for searching the dependency tree to locate the virtual computer name and for writing the virtual computer name into the block of information; and
- an interface for receiving a request from the application to return a computer name thereto, the interface returning the virtual computer name in the block of information to the application as the computer name.

28. The system of claim 27 further comprising a child process of the application, the child process inheriting the block of information associated with the application, and a mechanism for returning the virtual computer name to the child process when the child process requests the return of a computer name thereto.

29. The system of claim 27 further comprising a selection mechanism for defining a virtual computer name for the application.

30. The system of claim 27 wherein the interface further detects the virtual computer name in the block of information before returning the virtual computer name to the application.

31. The system of claim 27 wherein the interface is an application programming interface.

32. The system of claim 27 wherein the application has a property set therefor, and wherein the mechanism is responsive to the property to search the dependency tree and to write the virtual computer name into the block of information.

33. In a server cluster, a method of failing over a computer name with an application, comprising:
(a) relating the application to a virtual computer name;
(b) on a first machine of the cluster:
  (i) associating the application with the virtual computer name;
  (ii) running the application;
  (iii) detecting a request for a computer name from the application;
  (iv) returning the virtual computer name in response to the request; and
  (v) failing the application;
and
(c) on a second machine of the cluster:
  (i) associating the application with the virtual computer name;
  (ii) running the application;
  (iii) detecting a request for a computer name from the application, and
  (iv) returning the virtual computer name in response to the request.

34. The method of claim 33 wherein relating the application to a virtual computer name comprises storing the virtual computer name in a dependency tree.

35. The method of claim 33 wherein each step of associating the application with the virtual computer name comprises writing the virtual computer name into a process environment block associated with the application.

36. The method of claim 33 wherein each step of returning the virtual computer name in response to the request comprises reading the virtual computer name from the process environment block associated with the application.

37. A computer-readable medium having computer executable instructions for performing the method of claim 33.

38. A method of selectively returning a computer identity to a running application, comprising:
(a) running the application on a machine having a first computer identity;
(b) receiving a request from the application to return a computer identity to the application, and in response:
  (i) determining if the application is set for failing over in a server cluster, and
    (1) if the application is set for failing over, returning a second computer identity that is independent of the machine in response to the request; and
    (2) if the application is not set for failing over, returning the first computer identity in response to the request.

39. The method of claim 38 wherein the machine is node of a server cluster, wherein the application is set for failing over in the server cluster and has the second computer identity returned thereto, and further comprising, failing over the application to another node of the server cluster, including providing the second computer identity to the other node.

40. The method of claim 38 wherein determining if the application is set for failing over in a server cluster includes evaluting information in a process environement block associated with the application.

41. The method of claim 38 wherein the second computer name is maintained in a dependency tree.

42. A computer-readable medium having computer executable instructions for performing the method of claim 38.

* * * * *